US011101922B1

(12) United States Patent
Schelstraete et al.

(10) Patent No.: US 11,101,922 B1
(45) Date of Patent: Aug. 24, 2021

(54) STREAM-BASED POWER ALLOCATION IN MULTI-STREAM TRANSMISSIONS

(71) Applicant: SEMICONDUCTOR COMPONENTS INDUSTRIES, LLC, Phoenix, AZ (US)

(72) Inventors: Sigurd Schelstraete, Menlo Park, CA (US); Reza Hoshyar, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/883,220

(22) Filed: May 26, 2020

(51) Int. Cl.
*H04L 5/00* (2006.01)
*H04L 1/00* (2006.01)
*H04L 27/26* (2006.01)

(52) U.S. Cl.
CPC .......... *H04L 1/0026* (2013.01); *H04L 1/0003* (2013.01); *H04L 5/006* (2013.01); *H04L 5/0007* (2013.01); *H04L 5/0023* (2013.01); *H04L 27/2602* (2013.01)

(58) Field of Classification Search
CPC . H04L 1/0026; H04L 5/0007; H04L 27/2602; H04L 5/006; H04L 5/0023; H04L 1/0003
See application file for complete search history.

(56) References Cited

U.S. PATENT DOCUMENTS

| 6,292,559 | B1 | 9/2001 | Gaikwad et al. | |
|---|---|---|---|---|
| 6,317,495 | B1 | 11/2001 | Gaikwad et al. | |
| 7,599,443 | B2 * | 10/2009 | Ionescu | H04B 7/0443 375/267 |
| 8,078,211 | B2 * | 12/2011 | Medvedev | H04B 7/0443 455/522 |
| 8,767,657 | B1 | 7/2014 | Dehghan et al. | |
| 9,362,993 | B2 * | 6/2016 | Stadelmeier | H04W 76/00 |
| 2003/0043732 | A1 * | 3/2003 | Walton | H04L 25/0204 370/208 |

(Continued)

FOREIGN PATENT DOCUMENTS

WO 2006039614 A1 4/2006

OTHER PUBLICATIONS

Aby Sebastian et al., "Reed-Solomon Encoder and Decoder," Electrical and Computer Engineering Department Rutgers, The State University of New Jersey, 25 pages, available at https://content.sakai.rutgers.edu/access/content/user/ak892/Reed-SolomonProjectReport.pdf and as printed on May 11, 2020.

(Continued)

*Primary Examiner* — Kenneth T Lam
(74) *Attorney, Agent, or Firm* — Ramey & Schwaller, LLP

(57) ABSTRACT

A wireless communications device comprises a transmitter configured to distribute a data stream as a plurality of sub-streams, allocate power to each sub-stream of the plurality of sub-streams, and convert the sub-streams into one or more transmit signals. The wireless communications device also comprises a processor which is configured to obtain channel-quality indicators corresponding to the sub-streams and adjust one or more power allocations of one or more sub-streams to reduce a collective error rate of the data stream based on the channel-quality indicators, subject to a total power limit.

15 Claims, 5 Drawing Sheets

(56) References Cited

U.S. PATENT DOCUMENTS

| | | | |
|---|---|---|---|
| 2006/0013181 A1* | 1/2006 | Stolpman | H03M 13/033 |
| | | | 370/342 |
| 2006/0067428 A1* | 3/2006 | Poon | H04W 52/34 |
| | | | 375/299 |
| 2008/0192683 A1* | 8/2008 | Han | H04L 5/0064 |
| | | | 370/329 |
| 2010/0061472 A1* | 3/2010 | Molnar | H04L 1/0026 |
| | | | 375/260 |
| 2010/0279701 A1* | 11/2010 | Chen | H04L 1/20 |
| | | | 455/452.2 |
| 2011/0045790 A1* | 2/2011 | Lindoff | H04B 17/336 |
| | | | 455/226.3 |
| 2012/0034924 A1* | 2/2012 | Kalhan | H04W 52/34 |
| | | | 455/444 |
| 2016/0057657 A1 | 2/2016 | Seok | |
| 2019/0341988 A1 | 11/2019 | Schelstraete et al. | |

OTHER PUBLICATIONS

Aitor del Coso et al., "Virtual MIMO Channels in Cooperative Multi-hop Wireless Sensor Networks," 6 pages, available at https://www.ece.iastate.edu/~namrata/EE597/mimo_channels.pdf and as printed on May 11, 2020.

Stefan Schindler et al., "Assessing a MIMO Channel," Rohde & Schwarz, Feb. 2011, 18 pages, available at https://cdn.rohde-schwarz.com/pws/dl_downloads/dl_application/application_notes/1sp18/1SP18_10e.pdf.

* cited by examiner

US 11,101,922 B1

STREAM-BASED POWER ALLOCATION IN MULTI-STREAM TRANSMISSIONS

TECHNICAL FIELD

This disclosure pertains generally to wireless communications and particularly to improving data throughput in wireless communications.

BACKGROUND

In multiple-input, multiple-output (MIMO) communications a channel's spatial streams may experience differing error rates (ER), the effect of which is to reduce the overall efficiency of the channel. Attempts to increase channel effectiveness by managing individual streams have not been wholly successful. Thus, there is room for improvement in the art.

SUMMARY

An example of this disclosure is a wireless communications device comprising: a transmitter configured to: distribute a data stream as a plurality of sub-streams; allocate power to each sub-stream of the plurality of sub-streams; and convert the sub-streams into one or more transmit signals; and a processor configured to: obtain channel-quality indicators corresponding to the sub-streams; and adjust one or more power allocations of one or more sub-streams to reduce a collective error rate (CER) of the data stream based, at least in part, on the channel-quality indicators, wherein the one or more power allocations are subject to a total power limit.

An example of this disclosure is a method of operating a wireless communications device, the method comprising: distributing, using a transmitter, a data stream as a plurality of sub-streams; allocating, using a processor, power to each sub-stream of the plurality of sub-streams; converting, using the transmitter, the sub-streams into one or more transmit signals; determining, using the processor, channel-quality indicators corresponding to the sub-streams; and adjusting, using the processor, one or more power allocations of one or more sub-streams based, at least in part, on the channel-quality indicators, wherein the one or more power allocations are subject to a total power limit.

The figures and the following detailed description do not limit the disclosure, but on the contrary, they provide the foundation for understanding all modifications, equivalents, and alternatives falling within the scope of the appended claims. Specific configurations, parameter values, and examples are explanatory, not restrictive.

DETAILED DESCRIPTION

Aspects of this disclosure pertain to beamforming in a multi-stream transmission environment. In beamforming-based communications, a channel includes a plurality of data streams, and each stream has an individuated signal-to-noise ratio (SNR). Examples of this disclosure are concerned with optimizing channel performance, such as by optimizing throughput while not exceeding a predetermined limit on transmitter power.

Figure 1:
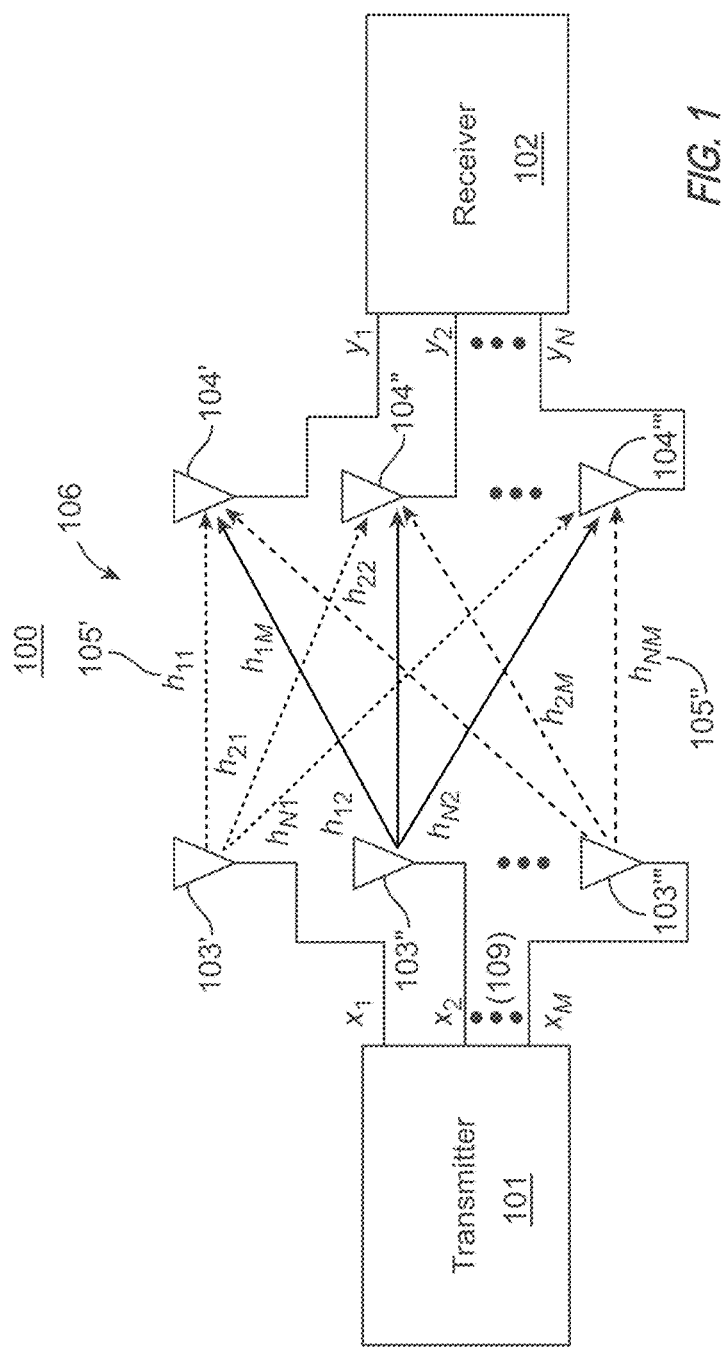
FIG. 1 illustrates an operational environment of a transmitter and a receiver, in accordance with an example of this disclosure.

FIG. 1 illustrates an operational environment 100 of a transmitter 101 and a receiver 102, in accordance with an example of this disclosure. In FIG. 1, multiple data streams 105 are multiplexed over M transmit antennas 103 and received by N receive antennas 104. The data streams 105 are based on M transmit signals 109. The multiple data streams 105 collectively form a channel 106. Such factors as the positions of individual transmit antennas 103 and individual receive antennas 104, signal strength, and unintended coupling of individual transmit antennas 103 and individual receive antennas 104 can affect the state of the channel 106.

Figure 2:
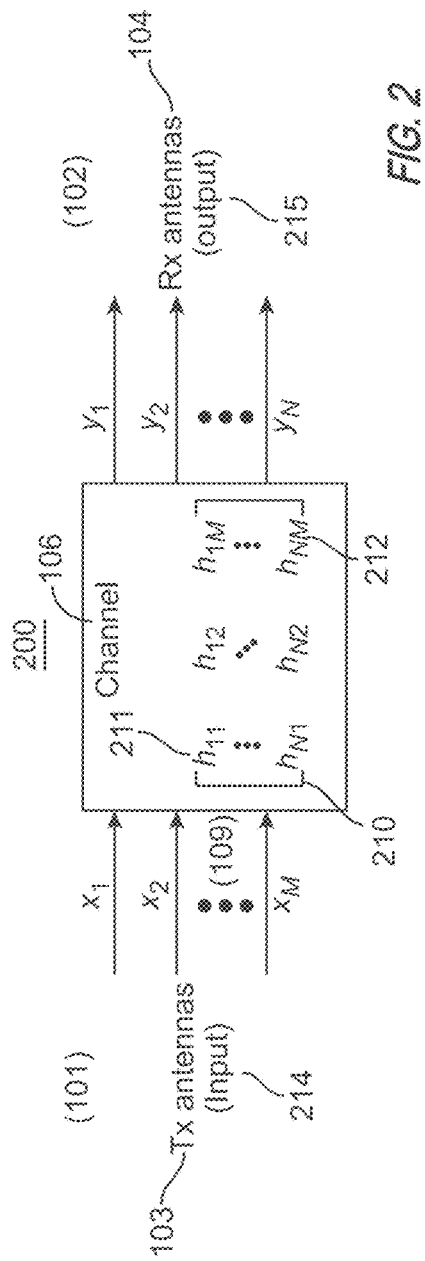
FIG. 2 illustrates a channel matrix of the transmitter of FIG. 1.

FIG. 2 illustrates the relationship of the transmitter 101 and the receiver 102 of FIG. 1 from a channel perspective 200. In FIG. 2, channel matrix H 210 represents the channel conditions between the transmitter 101 and the receiver 102. The direct path (105') between transmit antenna 103' and receive antenna 104' of FIG. 1 is represented by channel response $h_{11}$ 211. The channel response of the path between transmit antenna 103' and receive antenna 104" is $h_{21}$ and so on through $h_{NM}$ 212 (105"). Channel matrix H 210 has N rows and M columns. Receiver 102 has an associated receiver response (y=Hx+n) based on the channel matrix H 210, in which x is an input 214 vector and n is a noise vector. To the extent possible, the receiver 102 solves for x based on the receiver response in accordance with transmission matrix H 210.

Under ideal conditions, the data 215 received by the receiver 102 would exactly match the data (input) 214 transmitted by the transmitter 101. However, ideal conditions seldom occur. If one hundred pieces of information are transmitted over a channel 106 and ninety-five pieces of information are correctly received, the ER for that transmission would be 5% (and the accuracy rate would be 95%). As noted, the channel 106 is composed of multiple streams 105. The accuracy with which information is transmitted by the channel 106 depends on the accuracy of the streams 105. Likewise, the ER of the channel 106 (a CER) is a consequence of the ER of the streams 105. In some examples of this disclosure, there is a positive correlation between the accuracy of a transmission and the signal strength of that transmission. In some examples, there is a positive correlation between the accuracy of a transmission and the SNR of that transmission. The corollary of this principle is that there is an inverse relationship between the ER of a transmitted signal (e.g., a data stream 105), and the SNR of that signal. Likewise, there is an inverse relationship between the ER of a transmitted signal and the signal-to-interference-plus-noise ratio (SINR) of that signal. SNR is thus a strong indicator of transmission accuracy. (If the signal or channel 106 carries bits of information, the signal or channel 106 can be said to have a bit-error rate (BER)). In the case of a channel 106 consisting of K streams 105 (or derived from K streams), the channel's quality is impacted by the $SNR_K$ of each stream 105. That is, $SNR/SNR_K/SINR/SINR_K$ can be strong indicators of channel quality.

In accordance with one or more examples of this disclosure, SNR of a signal can be increased by transmitting that signal with greater power. By the same token, ER and BER for a signal can be reduced by transmitting that signal with greater power. As a channel 106 is composed of multiple streams, optimizing throughput of the channel 106, (e.g, minimizing the collective bit-error rate of the composite streams 105), could be construed as a matter of allocating more power to streams with lower SNR. However, when the total amount of power available for the channel 106 is limited—and the number of streams is many—managing or optimizing channel quality by apportioning power amongst the sub-streams of a channel 106 is far from simple.

Figure 3A:
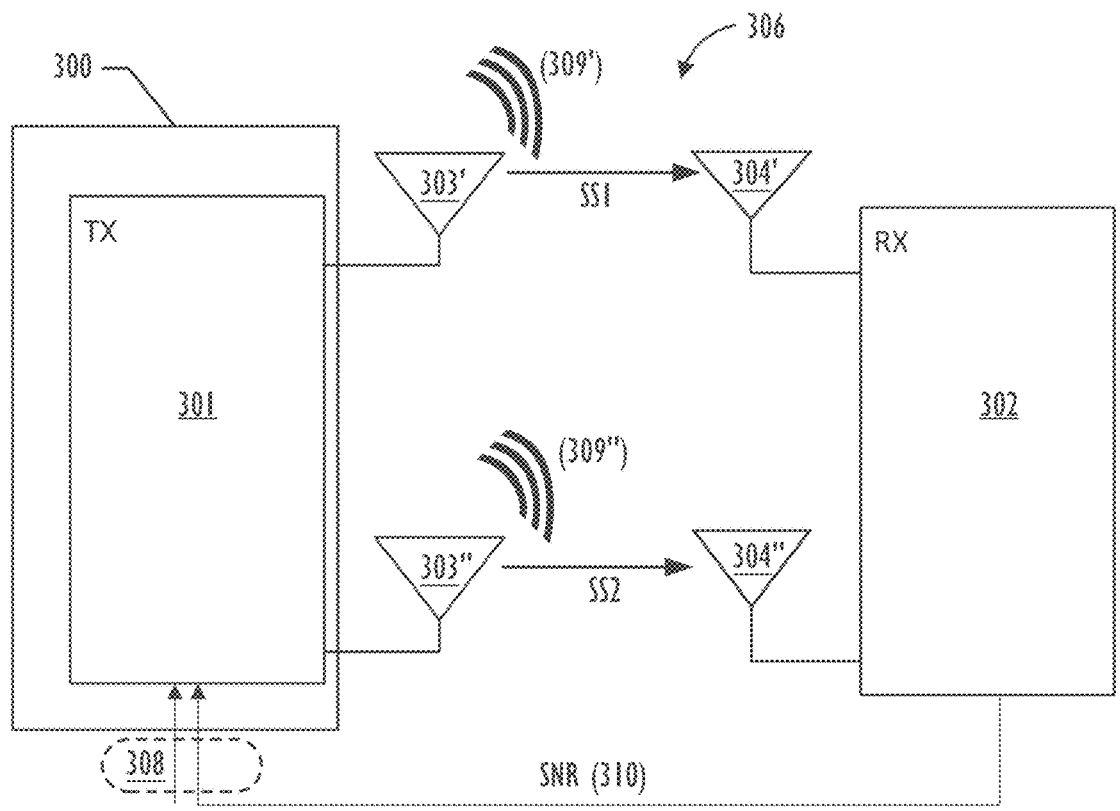
FIG. 3A illustrates an operational environment of a wireless communications device, in accordance with an example of this disclosure.

FIG. 3A illustrates a wireless communications device 300 in an operational environment, in accordance with an example of this disclosure. The wireless communications device 300 includes a transmitter 301 (e.g., 101). The wireless communications device 300 uses transmit antennas 303 (e.g., 103) to emit transmit signals 309 (e.g., 109) which can be received by a receiver 302 (e.g., 102). In FIG. 3A, a simple channel 306 is present between two transmit antennas 303 (of the transmitter 301) and two receive antennas 304 of the receiver 302. The channel 306 has two streams, stream SS1 and stream SS2. The channel 306 can be represented by the channel matrix H:

$$H = \begin{bmatrix} \lambda_1 & 0 \\ 0 & \lambda_2 \end{bmatrix}$$

When the two streams (SS1, SS2) are mapped directly to the eigenmodes of the channel 306, the first stream SS1 will experience an attenuation of $\lambda_1$, while the second stream SS2 will experience an attenuation of $\lambda_2$. For a given noise variance $\sigma^2$ at the receiver 302 and a total transmit power normalized to 1 and distributed equally to the two streams, the two streams will have an SNR of $\lambda_1^2/2\sigma^2$ and $\lambda_2^2/2\sigma^{-2}$ respectively. The signal strength of each stream can be scaled individually, and the channel can be scaled in accordance with scaling matrix S:

$$S = \begin{bmatrix} \alpha_1 & 0 \\ 0 & \alpha_2 \end{bmatrix}$$

In scaling matrix S, the sum of the squares of scaling values ($\alpha 1$, $\alpha 2$) is 1 because the ability to scale the streams $\lambda_1$, $\lambda_2$ is subject to a power limitation (e.g., $\alpha_1^2 + \alpha_2^2 = 1$). That is, the amount of power that the transmitter 301 is permitted to emit is fixed. Extra power which is allocated to one stream comes from power allocated to the other stream. The effective channel 306 becomes $H_{\it eff}$:

$$H_{\it eff} = \begin{bmatrix} \lambda_1 & 0 \\ 0 & \lambda_2 \end{bmatrix} \begin{bmatrix} \alpha_1 & 0 \\ 0 & \alpha_2 \end{bmatrix}$$

As a result of the scaling, the two streams now experience an SNR of $\lambda_1^2\alpha_1^2/\sigma^2$ and $\lambda_2^2\alpha_2^2/\sigma^2$ respectively. The behavior of the channel 306 depends on the SNR of each stream, the differences between the SNR of each stream and each of the other streams, and the constellation size of the channel, (e.g., the quantity of non-identical symbols that can be conveyed by a stream). For example, for a channel in which information can be conveyed as one of eight binary symbols—with each symbol represented by three bits of data—the constellation size would be three (3). Because $\alpha_1^2 + \alpha_2^2 = 1$ the scaled SNR of stream SS2 can be written as a function of the scaling which is applied to stream SS1. To wit:

$$SNR_2 = \frac{\lambda_2^2(1-\alpha^2)}{\sigma^2}$$

In the case of a K-stream transmission, the streams each have $SNR_k$, (denoted as $SNR_1$, $SNR_2$, . . . , $SNR_K$ respectively.) Depending on the modulation of the K-stream transmission, each SNR results in a certain BER, denoted as $BER(SNR_i)$. Thus, the combined BER of all K streams can be written as:

$$BER_{tot} = \frac{BER(SNR_1) + \ldots + BER(SNR_K)}{K}$$

In at least one example of this disclosure, if all streams in a channel 306 use the same modulation scheme, a similar expression holds for the symbol error rate (SER) of that channel 306, (e.g., a probability of receiving a symbol in error). The (unencoded) bit-error rate (BER) of a channel can be expressed as a function of SNR in accordance with the channel's constellation size.

The wireless communications device 300 is configured to obtain quality indicators 308 regarding the transmitter's channel (e.g., 106). The channel-quality indicators 308 can take the form of SNR information 310 provided to the transmitter 301 by the receiver 302. In accordance with one or more examples of this disclosure, transmitter 301 can obtain other indicators 308 of channel quality from other sources. In accordance with this disclosure, transmitter 301 can derive channel-quality indicators 308 through other methods and mechanisms.

Figure 3B:
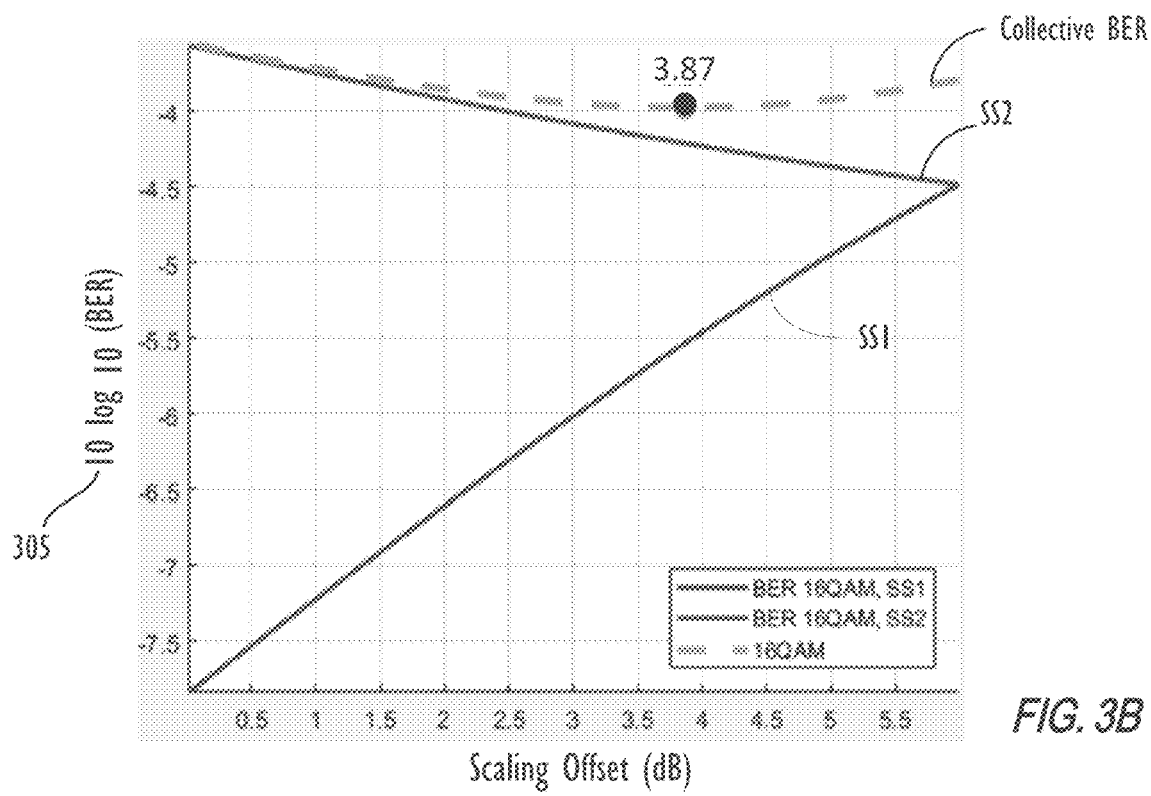
FIG. 3B illustrates the behavior of the transmission channel of the wireless communications device of FIG. 3A.

FIG. 3B illustrates the behavior of the 2-stream MIMO transmission channel 306 of FIG. 3A. The channel is a 16-QAM channel, meaning that the number of non-identical symbols of the channel is sixteen, (e.g., 0000 through 1111). As more power is allocated to the second stream (SS2), the BER of stream SS2 declines monotonically, while the BER of stream SS1 increases. However, the combined (collective) BER for the channel 306 is minimized at a value (3.87 on the BER scale 305) which is not an optimum value on the BER-scaling plot of either stream SS1 or stream SS2. Identifying the individual scaling offset 307 values (e.g., power allocations) that provide the lowest BER in the two-stream example is not overly rigorous.

As noted, the uncoded BER for a channel can be written as a function of the channel's per-stream scaling values. In the two-stream example of FIG. 3B, the scaling of the streams that respects the total power constraint can be written as:

$$scaling_{SS1} = \alpha \text{ (and)} \qquad \qquad \text{Expression 1:}$$

$$scaling_{SS2} = \sqrt{1-\alpha^2} \qquad \qquad \text{Expression 2:}$$

The channel BER can therefore be written as:

$$BER_{tot} = \frac{BER(\alpha^2 \times SNR_1) + BER((1-\alpha^2) \times SNR_2)}{2}$$

The channel BER is thus a function of a single variable a and requires a one-dimensional search for the minimum in the range $\alpha \in [0, 1]$. Once the optimal a is found, the scaling of the streams is given by expressions 1-2 above.

For the case of three streams however, the scaling of the streams is written as a function of two independent parameters:

$$scaling_{SS1} = \alpha_1 \alpha_2$$

$$scaling_{SS2} = \alpha_1 \sqrt{1-\alpha_2^2}$$

$$scaling_{SS3} = \sqrt{1-\alpha_1^2}$$

For three streams, the collective BER can be written as:

$$BER_{tot} = \frac{BER(\alpha_1^2 \alpha_2^2 \times SNR_1) + BER(\alpha_1^2(1-\alpha_2^2) \times SNR_2) + BER((1-\alpha_1^2) \times SNR_3)}{3}$$

The three-stream BER is a function of two variables in the range [0, 1]. Finding the best $BER_{tot}$ requires a 2-dimensional optimization. For a four-stream channel, a full 3-dimensional optimization search is computationally prohibitive. In accordance with one or more examples of this disclosure, the quantity of streams in question is much greater than four. In examples of this disclosure, BER is minimized in accordance with one or more approximations. For example, power can be allocated in a manner that minimizes raw SER. In binary phase shift keying (BPSK) and quadrature phase shift keying (QPSK), the bit-error rate of each sub-stream is expressible as:

$$\frac{1}{2} \text{erfc}\left(\sqrt{p_k SNR_k}\right)$$

where $SNR_k$ is a SNR value of a kth sub-stream, and $p_k$ is a power allocation of each sub-stream subject to the total power limit, the total power limit expressible as $$\sum_{k=1}^{K} p_k,$$

and k is a sub-stream index, (coefficient).

In the case of quadrature amplitude modulation (QAM), the unencoded BER is expressible as:

$$\frac{2}{\log_2 M} \times \left(1 - \frac{1}{\sqrt{M}}\right) \times \text{erfc}\left(\sqrt{\frac{3}{2} \frac{p_k SNR_k}{M-1}}\right)$$

where $SNR_k$ is a SNR value of a kth sub-stream 416, M is a constellation size of the kth sub-stream 416, where $p_k$ is a power allocation of each sub-stream subject to the total power limit, (e.g., $$\sum_{k=1}^{K} p_k$$

and where k is a sub-stream index.

In at least one example of this disclosure, the BER of each sub-stream is expressible as $e^{-p_k SNR_k}$, where $SNR_k$ is a SNR value of the kth sub-stream 416, $p_k$ is the power allocation for each sub-stream 416 (subject to the total power limit). Here, the total power limit is expressible as $$\sum_{k=1}^{K} p_k,$$

and k is the sub-stream index.

In a similar vein, in one or more examples of this disclosure, the power allocation ($p_k$) of each sub-stream 416 is determined according to the following relationship:

$$p_k = \frac{1}{SNR_k}\left(\xi - \ln\frac{1}{SNR_k}\right)^+$$

in which $$\xi = \frac{P + \sum_{k=1, p_k > 0}^{K} \frac{1}{SNR_k} \ln\frac{1}{SNR_k}}{\sum_{k=1, p_k > 0}^{K} \frac{1}{SNR_k}}$$

and $$(x)^+ = \begin{cases} x & 0 \leq x \\ 0 & x < 0 \end{cases}.$$

Figure 4:
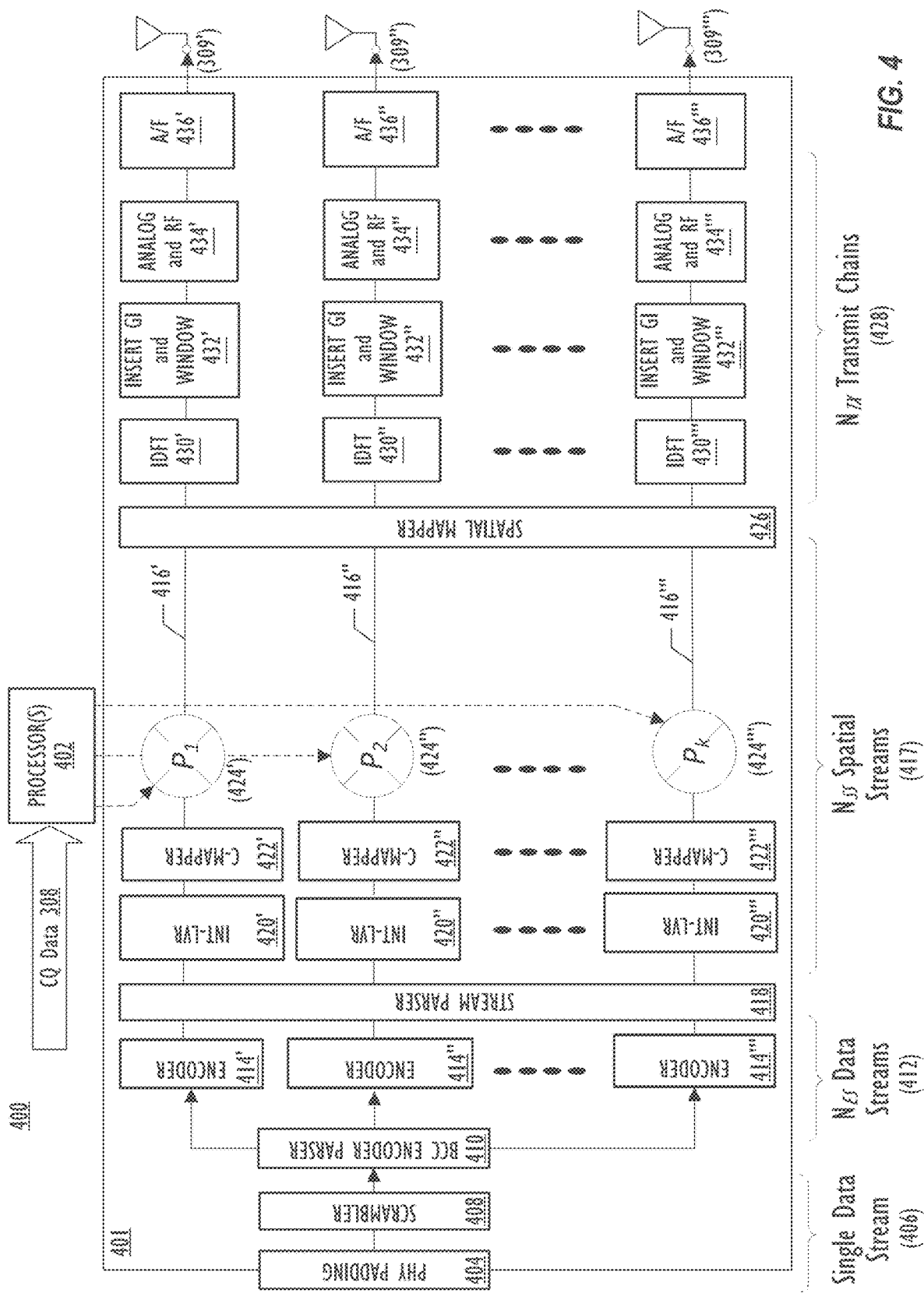
FIG. 4 illustrates details of a wireless communications device, in accordance with an example of this disclosure.

FIG. 4 is a block diagram of a wireless communications device 400 (e.g. 300), in accordance with an example of this disclosure. The wireless communications device 400 includes a transmitter 401 (e.g., 301) and at least one processor 402. The wireless communications device 400 includes a plurality of components that perform various functions, including the processor 402. In some examples of this disclosure, some of the functions may be performed by fewer components, with some components being subsumed within others. For example, in some implementations, functions of one or more of the circuits shown may be performed by or controlled by one or more processors 402. In some examples, at least some of the components of the wireless communications device 400 reside on an integrated circuit. In at least one example, the wireless communications device 400 is an access point (AP).

The transmitter 401 distributes a (single) data stream 406 as a plurality of sub-streams 416. The transmitter 401 allocates power (P) to each sub-stream 416 of the plurality of sub-streams 416 and converts the sub-streams 416 into one or more transmit signals 309. In accordance with various examples of this disclosure, the transmit signals 309 form a channel (not shown) in the manner explained and described above. (See e.g., FIGS. 1-2.) In at least one example of this disclosure, allocating power to a sub-stream 416 includes increasing the signal strength of that sub-stream 416. The transmitter 401 is coupled to the processor 402, and the processor 402 is configured to obtain channel-quality (CQ) indicators (data) 308 corresponding to the sub-streams 416 and the transmit chains 428 of the transmit signals 309. The processor 402 is configured to adjust the amount of power (P) allocated 424 to individual sub-streams 416 to reduce a CER of the transmitter's channel based on the channel-quality data 308. In some examples of this disclosure, the processor 402 is configured to determine the power allocations 424 by solving one or more optimization problems (e.g., for minimizing the CER of the data stream 406.)

The wireless communications device 400 includes a PHY circuit 404. The PHY circuit 404 implements physical layer functions of the communications device 400 consistent with the Open Systems Interconnection (OSI) model known to those of skill in the art. The PHY circuit 404 connects some components of the wireless communications device 400 to a physical medium, such as a receiver antenna, optical fiber, copper cable, keyboard, touch screen or microphone, (not shown). The PHY circuit 404 receives a data stream 406 originating at some such physical medium. When needed, the PHY circuit 404 may include a PAD field (e.g., PHY padding-bits) in the data stream 406. The PHY padding-bits are used to match the number of coded bits of the last symbol in the stream 406 to a predetermined criterion. The PHY circuit 404 outputs the data stream 406 to the scrambler circuit 408. The scrambler circuit 408 outputs the (scrambled) single data stream 406 to the binary convolutional coding (BCC) or (low-density parity-check) LDPC encoding and parsing circuit 410. The BCC or LDPC encoding and parsing circuit 410 parses the single data stream 406 into multiple data streams 412. In at least one example of this disclosure, encoding and parsing circuit 410 demultiplexes the scrambled bits of the data stream 406 among a plurality ($N_{ES}$) of encoders 414. The encoders 414 encode the multiple data streams 412. The multiple data streams 412 are then parsed into multiple (K) sub-streams 416 by the stream-parsing circuit 418.

In accordance with one or more examples of this disclosure the multiple (K) sub-streams 416 correspond to $N_{SS}$ spatial streams 417. After parsing by the stream-parsing circuit 418, each sub-stream 416 passes to an interleaving circuit 420 which interleaves the bits of each sub-stream 416 (e.g., changes order of bits) to minimize the presence of long sequences of adjacent noisy bits in the sub-streams 416. In some examples of this disclosure, interleaving is applied only when BCC encoding is used. Each sub-stream 416 is received by a constellation mapper circuit 422, which maps the sequence of bits in each sub-stream 416 to constellation points (e.g., complex numbers).

Each sub-stream 416 of the K sub-streams 416 is allocated 424 (P) power. As shown in FIG. 4, a first sub-stream 416' is allocated 424 $P_1$ power, a second sub-stream 416" is allocated $P_2$ power, and so on through the $K^{th}$ sub-stream 416''', which is allocated $P_k$ power. In some examples of this disclosure, the total amount of power which can be allocated to the sub-streams 416 cannot exceed a power limit. In accordance with one or more examples of this disclosure, the sum of all power allocations 424 is fixed. In at least one example of this disclosure, the total amount of power that can be allocated to the streams 416 can be adjusted (such as by a user). In such situation, the power allocations 424 would be subject to the revised power ceiling (e.g., total power limit). As shown in FIG. 4, the amount of power that is allocated 424 to each sub-stream 416 is controlled by the processor(s) 402.

In at least one example of this disclosure, the data of the sub-streams 416 is spatially mapped by mapping circuit 426 using a spatial mapping matrix. Mapping circuit 426 maps the sub-streams 416 (e.g., space-time streams) to multiple transmit chains 428. In some examples of this disclosure, mapping the sub-streams 416 includes direct mapping, in which constellation points from each sub-stream 416 are mapped directly onto the transmit chains 428 (e.g., one-to-one mapping). In some examples, mapping the sub-streams 416 by the mapping circuit 426 includes spatial expansion, in which vectors of constellation points from the sub-streams 416 are expanded using matrix multiplication to produce the input to the transmit chains 428. In some examples, mapping the sub-streams 416 by the mapping circuit 426 includes beamforming, in which each vector of constellation points from the sub-streams 416 is multiplied by a matrix of steering vectors to produce the input to the transmit chains 428. In at least one example, the mapping circuit 426 modulates the sub-streams 416 in accordance with an orthogonal frequency-division multiplexing (OFDM) modulation scheme. The sub-streams 416 can thus be tones of OFDM modulation. In at least one example of this disclosure, the sub-streams 416 are a collection of spatial streams 417 of tones of OFDM modulation. In some examples, the processor uses OFDM and allocates 424 power for each OFDM tone.

In accordance with one or more examples of this disclosure, spatially mapped data of the sub-streams 416 are input to inverse discrete Fourier transform (IDFT) circuits 430 for conversion from the frequency domain to the time domain before transmission. Other operations can be performed on the data of the transmit chains 428. For example, a guard interval and windowing circuit 432 can insert guard intervals within the data of the transmit chains 428. Guard interval insertion can include prepending a circular extension of a symbol to that symbol. Guard interval and windowing circuit 432 can window data of the transmit chains 428. Windowing can include smoothing the edges of each symbol to increase spectral decay. In at least one example of this disclosure, an analog and radio frequency circuit 434 upconverts the complex baseband waveform from the guard interval and windowing circuit 432 to a radio frequency (RF) signal according to the center frequency of the desired channel. The RF signal of each transmit chain 428 is thereafter amplified using one or more amplifiers and filtered (A/F) using one or more filters, which are depicted collectively by A/F unit 436. After passing through A/F unit 436, the RF signals of the transmit chains 428 are transmitted as transmit signals 309.

In accordance with one or more examples of this disclosure, the components (e.g., transmitter blocks) are used to generate a data field of a 20 MHz, 40 MHz, or 80 MHz very high throughput (VHT) single-user (SU) physical layer (PHY) protocol data unit (PPDU) with BCC encoding. A subset of these transmitter blocks consisting of the constellation mapper(s) 422 and blocks to the right of, and including, the spatial mapping block 426, are also used to generate very high throughput long training field (VHT-LTF) fields.

Figure 5:
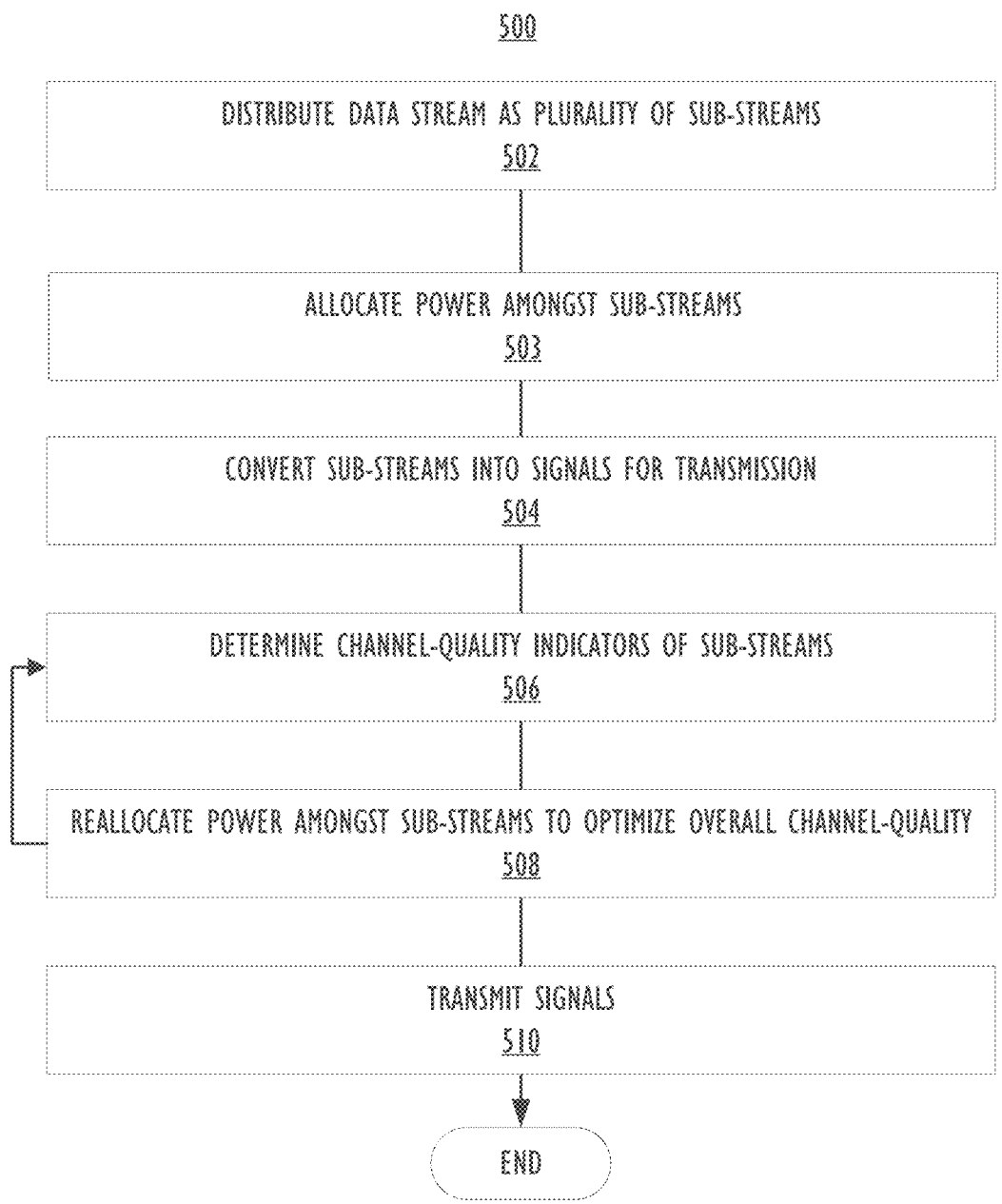
FIG. 5 illustrates a method of operating a wireless communications device, in accordance with an example of this disclosure.

FIG. 5 illustrates a method 500 of operating a wireless communications device 400, in accordance with an example of this disclosure. The method 500 comprises distributing 502 a data stream 406 as a plurality of sub-streams 416, using a transmitter 401. The method also includes allocating 503 (e.g., 424) power to each sub-stream 416 of the plurality of sub-streams 416, using a processor 402. The method 500 further includes converting 504 the sub-streams 416 into one or more transmit signals 309, using the transmitter 401. Furthermore, the method 500 includes determining 506—using the processor—channel-quality indicators 308 corresponding to the sub-streams 416, and reallocating 508 ((re)adjusting) at least some of the power allocated to one or more of the sub-streams 416 based the channel-quality indicators 308. As discussed, in one or more examples of this disclosure, the power allocations 424 are subject to a total power limit. In some examples, the method 500 also includes transmitting 510 the transmit signals 309, such as to a receiver (e.g., 102). As signals are transmitted 510, new channel-quality indicators 308 are determined 506 on an ongoing basis (see e.g., FIG. 6), and power is reallocated 508 to adjust for changing channel conditions to maximize channel throughput.

In accordance with one or more implementations of the method 500, the step of determining 506 channel-quality indicators 308 corresponding to the sub-streams 416 comprises determining the CER of the data stream 406. As noted, in some examples of this disclosure, the CER of the data stream 406 is expressible as a sum of analytical expressions for an ER of each sub-stream 416. In some examples, the CER of the data stream 406 can be expressed as a sum of approximations for the ER of each sub-stream 416. In at least one implementation of the method 500, the processor 402 determines power allocations 424 for the sub-streams 416 by solving optimization problems to minimize the CER of the data stream 406. In at least one instance of the method 500, the step of adjusting (reallocating) 508 (e.g., 424) the one or more power allocations 424 of one or more sub-streams 416 comprises reducing the CER of the data stream 406.

Figure 6:
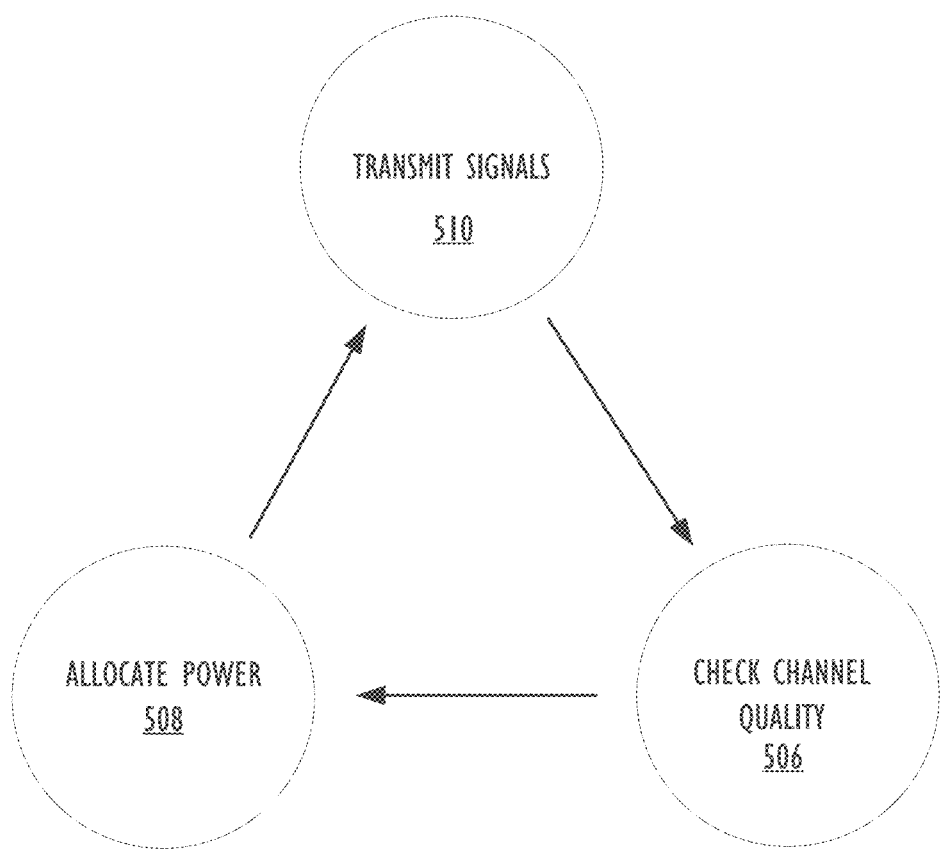
FIG. 6 illustrates aspects of the method of operating the wireless communications device of FIG. 5, in accordance with an example of this disclosure.

FIG. 6 is a flowchart illustrating the feedback nature of one or more implementations of method 500. As signals are transmitted 510, new channel-quality indicators 308 are determined 506, and power is reallocated 508 to adjust for changing channel conditions to maximize channel (e.g., 306) throughput.

Though the operations described herein may be set forth sequentially for explanatory purposes, in practice the method may be carried out by multiple components operating concurrently and perhaps even speculatively to enable out-of-order operations. The sequential discussion is not meant to be limiting. Modifications, equivalents, and alternatives, should be apparent to those skilled in the art. It is intended that the following claims be interpreted to embrace all such modifications, equivalents, and alternatives.

What is claimed is:

1. A wireless communications device comprising:
   a transmitter configured to:
   distribute a data stream as a plurality of sub-streams;
   allocate power to each sub-stream of the plurality of sub-streams; and
   convert the sub-streams into one or more transmit signals; and
   a processor configured to:
   obtain channel-quality indicators corresponding to the sub-streams; and
   adjust one or more power allocations of one or more sub-streams to reduce a collective error rate of the data stream based, at least in part, on the channel-quality indicators,
   wherein the one or more power allocations are subject to a total power limit,
   wherein the collective error rate of the data stream is a sum of error rate approximations for the sub-streams, the error rate approximation for each sub-stream being expressible as $e^{-p_k SNR_k}$, where $SNR_k$ is a signal-to-noise ratio value for a kth sub-stream, $p_k$ is a power allocation for the kth sub-stream, the total power limit is $$\sum_{k=1}^{K} p_k,$$

and k is a sub-stream index.

2. The wireless communications device of claim 1, wherein the sub-streams are tones of orthogonal frequency-division multiplexing modulation.

3. The wireless communications device of claim 1, wherein the sub-streams are a collection of spatial streams of tones of orthogonal frequency-division multiplexing modulation.

4. The wireless communications device of claim 1, wherein the processor is further configured to use orthogonal frequency-division multiplexing (OFDM) and allocate power for each OFDM tone.

5. The wireless communications device of claim 1, wherein the sub-streams include multiple spatial streams or space-time streams for conversion to the one or more transmit signals.

6. The wireless communications device of claim 1, wherein the channel-quality indicators are signal-to-noise ratio values for each of the sub-streams.

7. The wireless communications device of claim 1, wherein the processor is further configured to determine the power allocations based on optimizing for minimizing the collective error rate of the data stream.

8. The wireless communications device of claim 1, wherein the collective error rate of the data stream is a sum of analytical expressions for an error rate of each sub-stream or as a sum of approximations for the error rate of each sub-stream.

9. The wireless communications device of claim 8, wherein the collective error rate of the data stream is a collective symbol error rate and the error rate of each sub-stream is a symbol error rate of each sub-stream.

10. The wireless communications device of claim 8, wherein the collective error rate of the data stream is a collective bit-error rate and the error rate of each sub-stream is a bit-error rate of each sub-stream.

11. The wireless communications device of claim 1, wherein the processor is further configured to determine the power allocation of each sub-stream according to the relationship:

$$p_k = \frac{1}{SNR_k}\left(\xi - \ln\frac{1}{SNR_k}\right)^+,$$

wherein $$\xi = \frac{P + \sum_{k=1, p_k>0}^{K} \frac{1}{SNR_k} \ln \frac{1}{SNR_k}}{\sum_{k=1, p_k>0}^{K} \frac{1}{SNR_k}}$$

and $$(x)^+ = \begin{cases} x & 0 \le x \\ 0 & x < 0 \end{cases}.$$

12. A wireless communications device comprising:
a transmitter configured to:
  distribute a data stream as a plurality of sub-streams;
  allocate power to each sub-stream of the plurality of sub-streams; and
  convert the sub-streams into one or more transmit signals; and
a processor configured to:
  obtain channel-quality indicators corresponding to the sub-streams; and
  adjust one or more power allocations of one or more sub-streams to reduce a collective error rate of the data stream based, at least in part, on the channel-quality indicators,
  wherein the one or more power allocations are subject to a total power limit,
  wherein the collective error rate of the data stream is a sum of analytical expressions for a bit-error rate of each sub-stream, the bit-error rate of each sub-stream being expressible as $$\frac{1}{2} \text{erfc}\left(\sqrt{p_k SNR_k}\right)$$

for BPSK or QPSK, or $$\frac{2}{\log_2 M} \times \left(1 - \frac{1}{\sqrt{M}}\right) \times \text{erfc}\left(\sqrt{\frac{3}{2} \frac{p_k SNR_k}{M-1}}\right)$$

for M-QAM, where $SNR_k$ is a signal-to-noise ratio value of a kth sub-stream, M is a constellation size of the kth sub-stream, $p_k$ is a power allocation of each sub-stream, the total power limit is $$\sum_{k=1}^{K} p_k,$$

and k is a sub-stream index.

13. A method of operating a wireless communications device, comprising:
distributing, using a transmitter, a data stream as a plurality of sub-streams;
allocating, using a processor, power to each sub-stream of the plurality of sub-streams;
converting, using the transmitter, the sub-streams into one or more transmit signals;
determining, using the processor, a collective error rate of the data stream by determining a sub-stream error rate corresponding to each sub-stream and summing the sub-stream error rates; and
adjusting, using the processor, one or more power allocations of one or more sub-streams to reduce the collective error rate of the data stream,
wherein the one or more power allocations are subject to a total power limit,
wherein the sub-stream error rate corresponding to each sub-stream is expressible as $e^{-p_k SNR_k}$, $SNR_k$ being a signal-to-noise ratio value of a kth sub-stream, $p_k$ being a power allocation of each sub-stream, the total power limit being $$\sum_{k=1}^{K} p_k,$$

and k being a sub-stream index.

14. The method of claim 13, wherein said adjusting comprises determining a power allocation of each sub-stream according to the relationship:

$$p_k = \frac{1}{SNR_k}\left(\xi - \ln\frac{1}{SNR_k}\right)^+,$$

wherein $$\xi = \frac{P + \sum_{k=1, p_k>0}^{K} \frac{1}{SNR_k} \ln \frac{1}{SNR_k}}{\sum_{k=1, p_k>0}^{K} \frac{1}{SNR_k}}$$

and $$(x)^+ = \begin{cases} x & 0 \le x \\ 0 & x < 0 \end{cases}.$$

15. A method of operating a wireless communications device, comprising:
distributing, using a transmitter, a data stream as a plurality of sub-streams;
allocating, using a processor, power to each sub-stream of the plurality of sub-streams;
converting, using the transmitter, the sub-streams into one or more transmit signals;
determining, using the processor, a sub-stream error rate corresponding to each sub-stream and a collective error rate of the data stream therefrom; and
adjusting, using the processor, one or more power allocations of one or more sub-streams to reduce the collective error rate of the data stream,
wherein the one or more power allocations are subject to a total power limit,
wherein the sub-stream error rate of each sub-stream is $$\frac{1}{2}\text{erfc}\left(\sqrt{p_k SNR_k}\right)$$

for BPSK or QPSK, or $$\frac{2}{\log_2 M} \times \left(1 - \frac{1}{\sqrt{M}}\right) \times \text{erfc}\left(\sqrt{\frac{3}{2}\frac{p_k SNR_k}{M-1}}\right)$$

for M-QAM, $SNR_k$ is a signal-to-noise ratio value of a kth sub-stream, M is a constellation size of the kth sub-stream, $p_k$ is a power allocation of each sub-stream, the total power limit is $$\sum_{k=1}^{K} p_k,$$

and k is a sub-stream index.

* * * * *